(12) United States Patent
Chen et al.

(10) Patent No.: US 6,748,404 B1
(45) Date of Patent: Jun. 8, 2004

(54) DATA EDITABLE STATISTIC CALCULATOR, AND THE RELATED DATA EDITING METHOD

(75) Inventors: Frank Chen, Taipei Hsien (TW); Su Mei Chen, Taipei Hsien (TW)

(73) Assignee: Kinpo Electronics, Inc., Taipei (TW)

( * ) Notice: Subject to any disclaimer, the term of this patent is extended or adjusted under 35 U.S.C. 154(b) by 622 days.

(21) Appl. No.: 09/642,790

(22) Filed: Aug. 22, 2000

(51) Int. Cl.$^7$ .................................................. G06F 3/00
(52) U.S. Cl. ........................................................ 708/136
(58) Field of Search ................................. 708/131, 136

(56) References Cited

U.S. PATENT DOCUMENTS

| | | | | |
|---|---|---|---|---|
| 3,983,380 A | * | 9/1976 | Sharif et al. ................. | 708/164 |
| 4,821,228 A | * | 4/1989 | Wickes et al. ................ | 708/530 |
| 4,885,714 A | * | 12/1989 | Eisenstein et al. ........... | 708/131 |
| 5,067,102 A | * | 11/1991 | Eisenstein .................... | 708/142 |
| 5,313,396 A | * | 5/1994 | Terpstra et al. .............. | 701/200 |
| 6,424,984 B1 | * | 7/2002 | Yao .............................. | 708/105 |

* cited by examiner

*Primary Examiner*—Tan V. Mai
(74) *Attorney, Agent, or Firm*—Bacon & Thomas, PLLC

(57) ABSTRACT

A data editable statistic calculator having an input device, a memory, a statistic computing unit, and an output device. The input device includes a set of number entry keys for data entry, enabling inputted data to be stored in registers in the memory, so that the user can fetch a specific datum from the registers sequentially with a function key for further editing through the number entry keys. When entering EDIT mode under statistic mode, the user can clearly find out the desired data for editing, and then delete or edit the data. By means of this humanized design, the user can conveniently review the correctness of every inputted data.

8 Claims, 5 Drawing Sheets

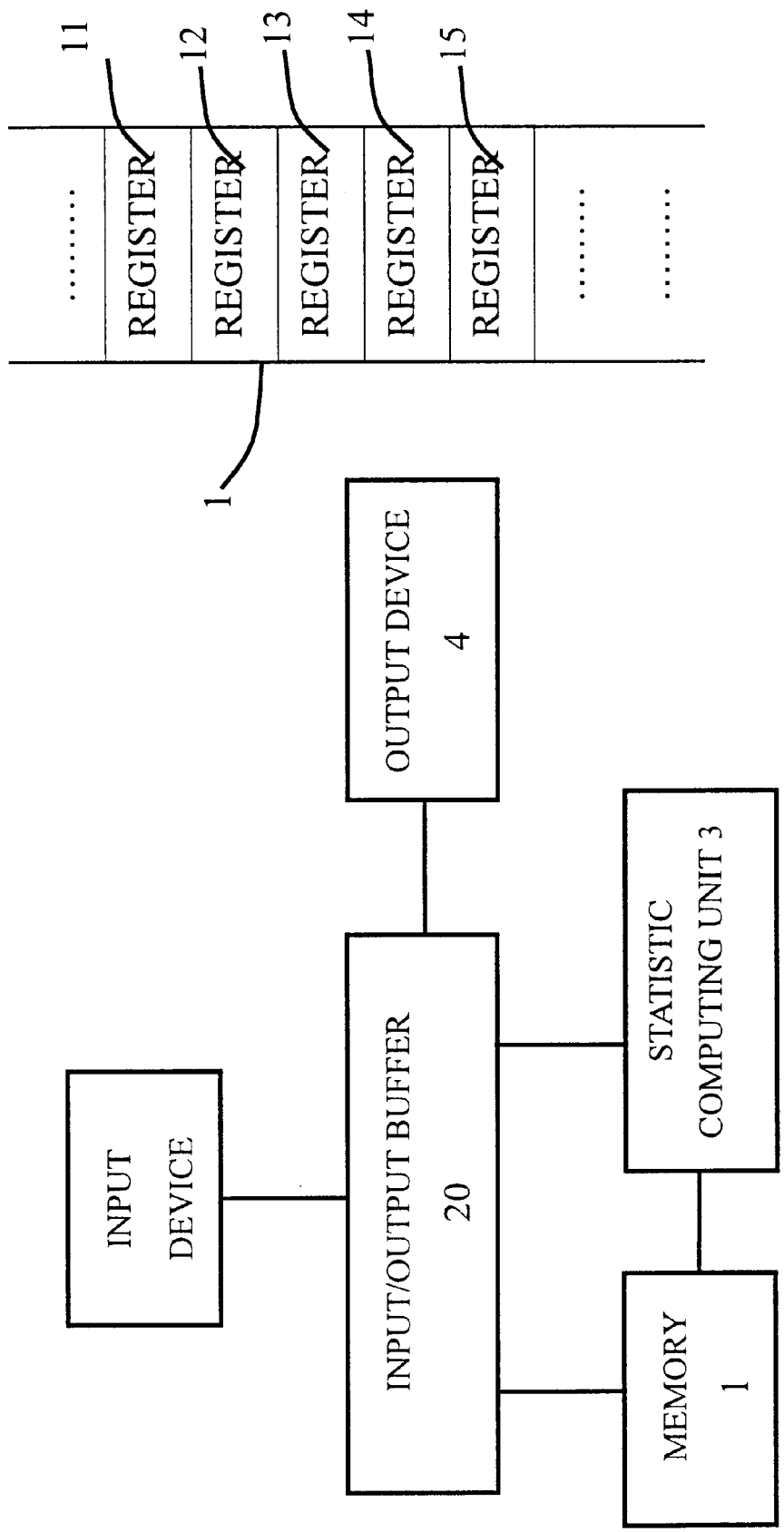

| | KEYPAD OPERATION | DISPLAY CONTENT |
|---|---|---|
| STEP E1 | EDIT | ED |
| STEP E2 | DATA | data 1 |
| | | -1-0-1- |
| | DATA | data 2 |
| | | -2-0-1- |
| STEP E3 | 25 | 25 |
| STEP E2 | DATA | data 3 |
| | | -3-0-1- |
| STEP E4 | ON/C | 0 |
| STEP S2 | n | 5 |
| | Σx | 155 |

|  | KEYPAD OPERATION | DISPLAY CONTENT |
|---|---|---|
| STEP E1 | EDIT | ED |
| STEP E2 | JUMP 2 | data 2 |
| STEP E3 |  | -20- |
|  | 25 | 25 |
| STEP E2 | ENTER | -30- |
| STEP E4 | ON/C | 0 |
| STEP S2 | n | 5 |
|  | Σx | 155 |

Fig. 9

|  | KEYPAD OPERATION | DISPLAY CONTENT |
|---|---|---|
| STEP E1 | EDIT | ED |
| STEP E2 | ENTER | -10- |
|  | ENTER | -20- |
| STEP E3 | 25 | 25 |
| STEP E2 | ENTER | -30- |
| STEP E4 | ON/C | 0 |
| STEP S2 | n | 5 |
|  | Σx | 155 |

Fig. 8

DATA EDITABLE STATISTIC CALCULATOR, AND THE RELATED DATA EDITING METHOD

BACKGROUND OF THE INVENTION

1. Field of the Invention

The present invention relates to an electronic calculator having statistic mode, and more particularly to such a statistic calculator (e.g. scientific calculator), which allows the user to edit inputted data. The invention relates also to the related data editing method, and computer readable media means that carries software program means adapted to execute the method.

2. Description of the Prior Art

Conventional scientific calculators commonly have a statistic mode computing function. However, because of the limitation of only one line display, the user cannot review every inputted data through one-line display, and can only edit inputted data under a blind operating environment.

SUMMARY OF THE INVENTION

The invention has been accomplished under the circumstances in view. It is the main object of the present invention to provide a humanized data editable statistic calculator and the related data editing method, which enable the user to clearly find out the desired data for editing. It is another object of the present invention to provide a data editable statistic calculator and the related data editing method, which allow the user to review the accuracy of each inputted data. To achieve these and other objects of the present invention, there is provided a data editable statistic calculator comprised of an input device, a statistic computing unit, and an output device. The memory is comprised of a plurality of registers. The input device comprises a set of number entry keys adapted to key in at least one datum for storage in the registers of the memory, and at least one function key adapted to fetch data from the registers for editing through the number entry keys. The statistic computing unit is adapted to compute the data stored in the registers, and then to produce a statistic result (for example, n, $\overline{X}$, $\Sigma x$, $\Sigma x^2$, s, $\sigma$ ... ). The output device is adapted to display data fetched by the at least one function key, or data edited by the number entry keys, or statistic result produced by the statistic-computing unit. The data editing method includes the first step (Step A) of entering EDIT mode, the second step (Step B) of fetching stored data, the third step (Step C) editing fetched data and storing edited data, and the last step (Step D) of ending EDIT mode. In Step B, it fetches stored data from the registers sequentially for further editing, or directly fetches a stored datum from a specific register for further editing.

BRIEF DESCRIPTION OF THE DRAWINGS

FIG. 1 is a functional block diagram of the present invention.

FIG. 2 is a schematic drawing showing the structure of the memory.

FIG. 8 illustrates an operation/display table under EDIT mode according to an alternate form of the present invention.

FIG. 9 illustrates an operation/display table under EDIT mode according to another alternate form of the present invention.

DETAILED DESCRIPTION OF THE PREFERRED EMBODIMENT

Figure 3:
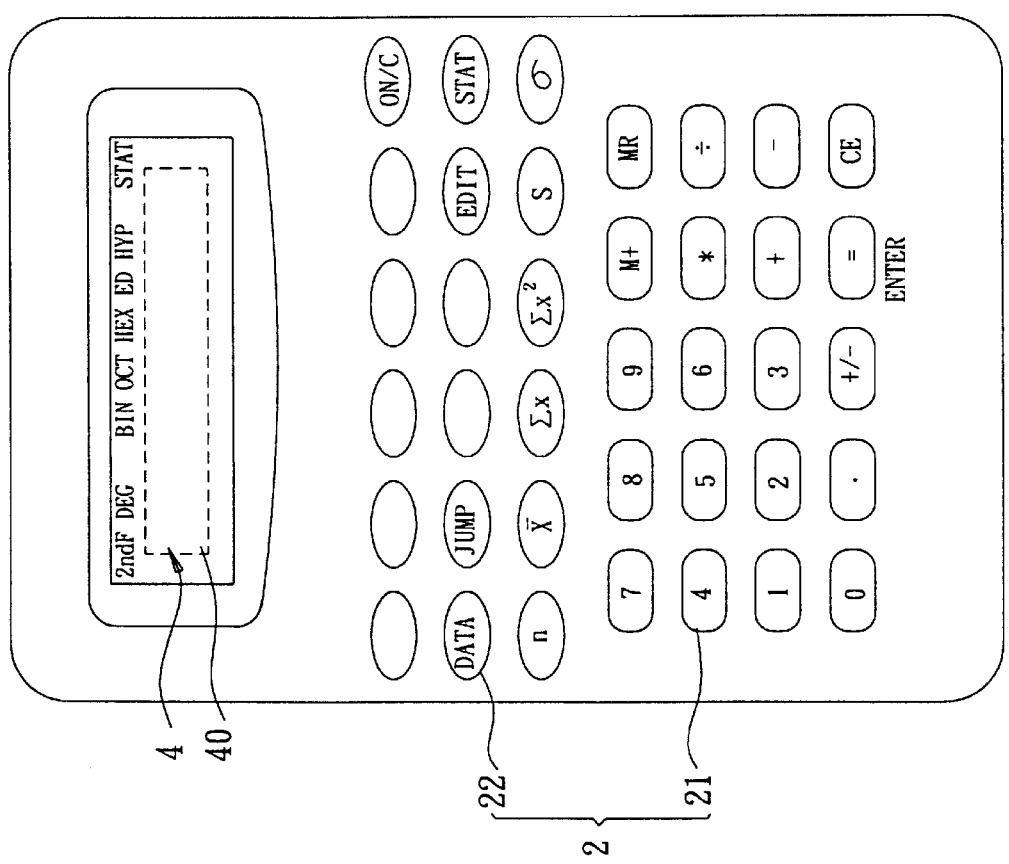
FIG. 3 illustrates the outer appearance of a data editable statistic calculator constructed according to the present invention.

Referring to FIG. 1, a statistic calculator in accordance with the present invention is shown comprised of a memory 1, an input device 2, a statistic-computing unit 3, and an output device 4. The memory 1, as shown in FIG. 2, is comprised of a number of registers 11, 12, 13, 14, 15 ... and etc. The input device 2, as illustrated in FIG. 3, is comprised of a plurality of number entry keys 21 and a plurality of function keys 22. The number entry keys 21 are adapted to input several required statistic data into input/output buffer 20 for storage in respective registers 11~15, so that the user can operate the function keys 22 to fetch the stored data from the registers 11~15, and to display the same in the one-line display screen 40 of the output device 4 for review and further editing with the number entry keys 21. The statistic computing unit 3 is adapted to compute statistic functions, such as n, $\overline{X}$, $\Sigma x$, $\Sigma x^2$, s, $\sigma$ ..., with the statistic data stored in the registers 11~15, enabling every computing result to be displayed in the output device 4.

With reference to FIGS. from 3 through 5, a regular key-in procedure is described hereinafter based on the following five statistic data:

data 1 = 10
data 2 = 20
data 3 = 30
data 4 = 40
data 5 = 50

Figures 4, 5:
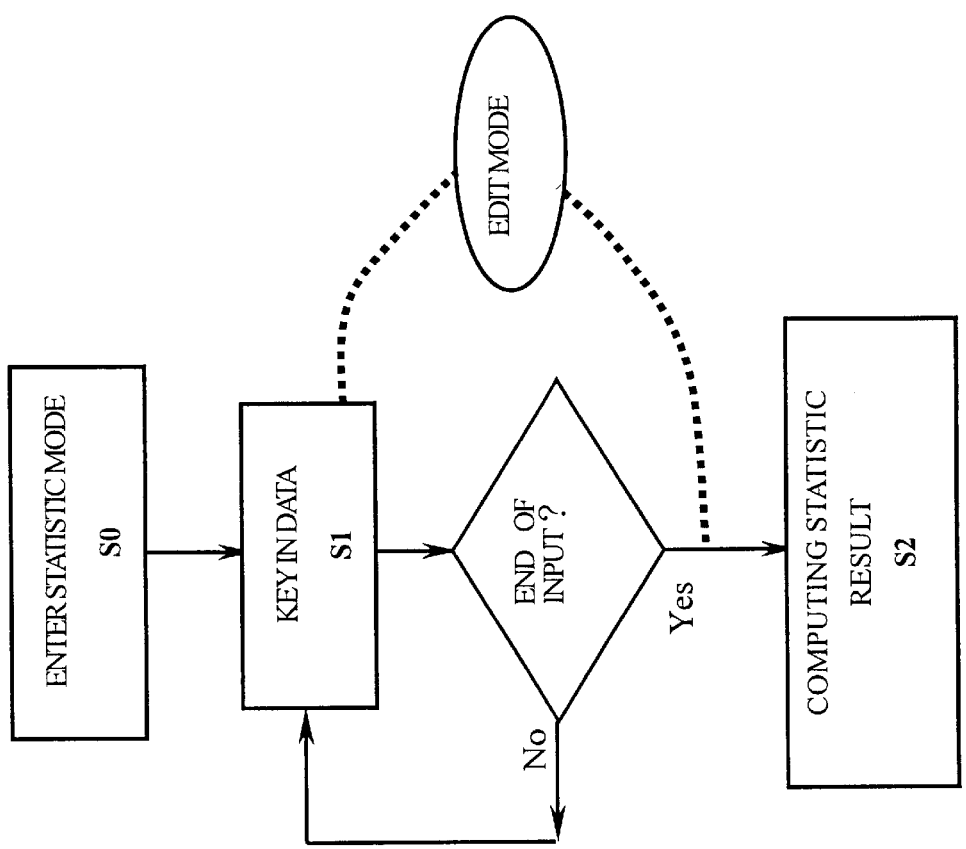
FIG. 4 is a flowchart under STAT mode according to the present invention.
FIG. 5 illustrates an operation/display table under STAT mode according to the present invention.

At first, as illustrated in FIG. 5, the user presses

STAT key to enter statistic mode (Step S0), and then keys in the aforesaid five statistic data one after another (Step S1), i.e., when the user presses

DATA key, the one-line display screen 40 flashes the words of "data 1", and then waits for the user to input the first statistic data "10" for storing in the first register 11; when the user presses

DATA key again, the one-line display screen 40 flashes the words of "data 2", and then waits for the user to input the second statistic data "20" for storing in the second register 12, and so on until all statistic data have been inputted and stored in the memory 1. When starting statistic computing (Step S2), the user presses the statistic function key $$\boxed{n}$$

to figure out the number of data n=5, or presses a statistic function key $$\boxed{\Sigma x}$$

to figure out the sum of the five statistic data $\Sigma x=150$.

The main characteristic of the present invention is the use of the registers 11~15 of the memory 1 to store respective statistic data. During statistic data input procedure (Step S1) or before computing of statistic data (of Step S2), the user can fetch stored statistic data from either register 11~15 for review, correction, or edit, and then store fetched statistic data again in the respective register after review, correction or edit.

Figures 6, 7:
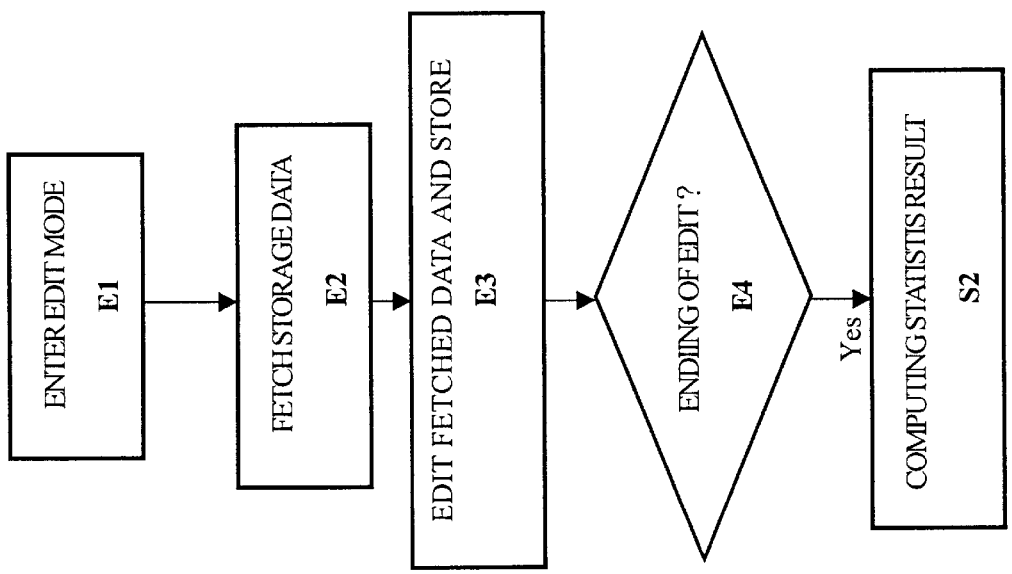
FIG. 6 is a flowchart under EDIT mode according to the present invention.
FIG. 7 illustrates an operation/display table under EDIT mode according to the present invention.

FIG. 6 illustrates the edit flowchart of the present invention. The present example is based on the input of the aforesaid five statistic data from data 1 through data 5. Please also refer to the input device 2 shown in FIG. 3 and the edit operation/display descriptions shown in FIG. 7. At first, (Step E1), the user presses the function key $$\boxed{\text{EDIT}}$$

to enter EDIT mode (see FIG. 7), then (Step E2) presses the function key $$\boxed{\text{DATA}}$$

several times to fetch the statistic data stored in the registers sequentially. At this time, the one-line display screen 40 of the output device 4 displays the words of "data 1", and then changes the display content from "data 1" to "10" automatically, which is the value of the statistic datum stored in the first register 11, after a predetermined length of time delay (for example 1.5 seconds), and then waits for the user to edit the data. If the fetched datum is not the one to be edited, the user presses the function key $$\boxed{\text{DATA}}$$

again to fetch and review the value of the next datum, and the procedure is repeated again and again until the datum to be edited appears. When the register 12 to be edited (data 2=20) appeared, (Step E3) the user presses the number entry keys 21 to key in new datum "25", and then presses function key, $$\boxed{\text{DATA}}$$

to store the new datum in the corresponding register 12. At final, (Step E4), the user presses function key $$\boxed{\text{ON/C}}$$

to trip out of EDIT mode, and to return to the procedure (Step S2) shown in FIG. 4 so as to run statistic computing, and the sum of the data is changed to $\Sigma x=155$ when the user presses function key $$\boxed{\Sigma x}$$

at this time.

FIG. 8 explains the operation of a rapid review function according to the present invention. Similar to the operation flowchart shown in FIG. 6 with the exception of the use of function key $$\boxed{\text{ENTER}}$$

instead of function key $$\boxed{\text{DATA}}.$$

Each time function key $$\boxed{\text{ENTER}}$$

is pressed during Step E2, the fetched datum is directly displayed and flashed on the one-line display screen 40 without any time delay (1.5 seconds) for quick review.

In the aforesaid two examples, it fetches data from the registers 11~15 sequentially for editing. FIG. 9 shows another rapid review/edit operation method. This architecture is similar to the aforesaid samples as shown in FIG. 6, with the exception of the use of function key $$\boxed{\text{JUMP}}$$

instead of function key $$\boxed{\text{ENTER}}$$

or function key $$\boxed{\text{DATA}}.$$

When pressing function key $$\boxed{\text{JUMP}}$$

and then inputting "2", it directly jumps to the specific second register 12 to fetch the stored datum "20" and then to display and flash the fetched datum on the one-line display screen 40 for quick review and edit.

The method and procedure of editing keyed-in statistic data can be carried out by means of a software program, which can be directly stored or compressed and then stored in any microprocessor recognizable, readable recording medium, or article or device carrying the recording medium such as ROM, RAM, IC Chip, Plug-in SMART card, FLASH card, or any article containing the medium and usable to a person skilled in the art. As the statistic calculator and its operation have been fully disclosed, any person skilled in the art of computer program language can write the software program after reading of the description of the present invention.

It is to be understood that the drawings are designed for purposes of illustration only, and are not intended for use as a definition of the limits and scope of the invention disclosed.

What is claimed is:

1. A data editable statistic calculator comprising:

memory means, said memory means comprising a plurality of registers;

input means, said input means comprising a set of number entry keys adapted to key in at least one datum of data for storage in said registers, and at least one function key adapted to fetch data from at least one of said registers in a selected one of the following two ways:
  (a) sequentially said data from a plurality of said registers for further editing through said number entry keys; and
  (b) jumping to and directly fetching a specific datum from any specific one of said registers for further editing through said number entry keys;

a statistic computing unit adapted to compute the data stored in said registers and to produce a statistic result; and output means adapted to display data fetched by said at least one fiction key, or data edited by said number entry keys, or statistic result produced by said statistic computing unit.

2. The data editable statistic calculator of claim 1 wherein said output means comprises a one-line display.

3. The data editable statistic calculator of claim 1 wherein said at least one function key is an ENTER or DATA key adapted to sequentially fetch data from said registers for further editing.

4. The data editable statistic calculator of claim 1 wherein said at least one function key is a JUMP key adapted to directly fetch one of said data from said specific register for further editing.

5. A method of editing inputted data in a statistic calculator capable of receiving, storing and statistically computing inputted data, the method comprising the steps of:
  (A) entering EDIT mode;
  (B) fetching stored data, wherein a JUMP key is used to jump to and directly fetch a specific datum from any specific one of a plurality of registers for editing;
  (C) editing fetched data, and then storing edited data; and
  (D) ending EDIT mode.

6. The method of claim 5, wherein said statistic calculator comprises one-line display means for data display.

7. The method of claim 5, wherein step (B) further comprises the step of, alternatively to using a JUMP key to directly fetch a specific datum, selectively using an ENTER or DATA KEY to sequentially fetch said stored data from a plurality of registers for editing.

8. A data editable statistic calculator comprising:

memory means, said memory means comprising a plurality of registers;

input means, said input means comprising a set of number entry keys adapted to key in at least one datum of data for storage in said registers, a JUMP key adapted to jump to and fetch a specific datum directly from any one of a plurality of said registers for further editing through said number entry keys;

a statistic computing unit adapted to compute the data stored in said registers and to produce a statistic result; and output means adapted to display data fetched by said at least one function key, or data edited by said number entry keys, or statistic result produced by said statistic computing unit.

* * * * *